(12) United States Patent
Fosback et al.

(10) Patent No.: US 9,443,258 B2
(45) Date of Patent: Sep. 13, 2016

(54) MASS INGESTION OF CONTENT RELATED METADATA TO AN ONLINE CONTENT PORTAL

(75) Inventors: Jason Fosback, Edmonds, WA (US); Ricardo Cortes, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 357 days.

(21) Appl. No.: 13/219,298

(22) Filed: Aug. 26, 2011

(65) Prior Publication Data

US 2013/0054548 A1 Feb. 28, 2013

(51) Int. Cl.
*G06F 7/00* (2006.01)
*G06F 17/00* (2006.01)
*G06Q 30/06* (2012.01)
*G06F 17/30* (2006.01)

(52) U.S. Cl.
CPC ......... *G06Q 30/06* (2013.01); *G06F 17/30923* (2013.01)

(58) Field of Classification Search
CPC .. G06Q 30/0601; G06Q 30/06; G06Q 30/00; G06Q 30/0253; G06Q 30/0641; G06Q 30/0208; G06Q 30/0237; G06Q 30/0239; G06Q 30/0251; G06F 21/10; G06F 21/121; G06F 17/3007; G06F 21/125; G06F 17/30734; G06F 17/30731; G06F 17/03
USPC .................................................. 707/694, 770
See application file for complete search history.

(56) References Cited

U.S. PATENT DOCUMENTS

| | | | |
|---|---|---|---|
| 6,381,742 | B2 | 4/2002 | Forbes et al. |
| 6,976,010 | B2 | 12/2005 | Banerjee et al. |
| 7,188,085 | B2 | 3/2007 | Pelletier |
| 7,328,049 | B2 | 2/2008 | Chanut |
| 7,613,770 | B2 | 11/2009 | Li |
| 7,958,163 | B2 | 6/2011 | Brentano et al. |

(Continued)

FOREIGN PATENT DOCUMENTS

| | | |
|---|---|---|
| CN | 1486461 | 3/2004 |
| CN | 1633631 | 6/2005 |

(Continued)

OTHER PUBLICATIONS

International Search Report and Written Opinion from PCT Application No. PCT/US2012/052386 dated Nov. 15, 2012.

(Continued)

*Primary Examiner* — Robert Beausoliel, Jr.
*Assistant Examiner* — Michael Pham
(74) *Attorney, Agent, or Firm* — Polsinelli LLP

(57) ABSTRACT

The present technology supports mass ingestion of metadata related to consumables related to online server supported applications. The online server publishes a specification defining metadata fields, allowed format values, and other parameters to facilitate the mass submission of metadata related to consumables. Metadata arranged according to the specification can be fed to the online server via a data stream or through submission of a document including metadata defining a plurality of consumables. The specification has been intelligently designed to account for the many different uses of consumables in applications supported by the server. As will be further described herein, the specification accounts for unique events pertaining to subscription content, in-application purchases, game performance and game award consumables, among others. Every type of consumable being submittable in the same document.

25 Claims, 9 Drawing Sheets

(56) References Cited

U.S. PATENT DOCUMENTS

| | | | |
|---|---|---|---|
| 7,962,634 B2 | 6/2011 | Cortos et al. | |
| 8,135,756 B2* | 3/2012 | Brentano et al. | 707/805 |
| 2002/0059110 A1 | 5/2002 | Yamamoto et al. | |
| 2002/0107795 A1 | 8/2002 | Minear et al. | |
| 2003/0225701 A1 | 12/2003 | Lee et al. | |
| 2004/0015445 A1 | 1/2004 | Heaven et al. | |
| 2004/0158546 A1 | 8/2004 | Sobel et al. | |
| 2005/0033774 A1 | 2/2005 | Brentano et al. | |
| 2005/0165656 A1 | 7/2005 | Frederick et al. | |
| 2005/0197946 A1 | 9/2005 | Williams et al. | |
| 2006/0074754 A1 | 4/2006 | Toyohara et al. | |
| 2006/0195399 A1 | 8/2006 | Tenenbaum et al. | |
| 2007/0038931 A1 | 2/2007 | Allaire et al. | |
| 2007/0073596 A1 | 3/2007 | Alexander et al. | |
| 2007/0133609 A1 | 6/2007 | Moore et al. | |
| 2007/0156594 A1 | 7/2007 | McGucken | |
| 2007/0208670 A1 | 9/2007 | Quoc | |
| 2007/0220051 A1* | 9/2007 | Brentano et al. | 707/104.1 |
| 2007/0233604 A1 | 10/2007 | Larson et al. | |
| 2007/0265969 A1 | 11/2007 | Horwat et al. | |
| 2007/0266047 A1* | 11/2007 | Cortes et al. | 707/104.1 |
| 2007/0294089 A1 | 12/2007 | Garbow et al. | |
| 2008/0052316 A1 | 2/2008 | Rangadass | |
| 2008/0133295 A1 | 6/2008 | Cappel et al. | |
| 2008/0233918 A1 | 9/2008 | Pousti | |
| 2009/0276433 A1 | 11/2009 | Fosback et al. | |
| 2009/0297126 A1* | 12/2009 | Cortes | H04N 7/17336 386/241 |
| 2009/0307695 A1 | 12/2009 | Chandnani | |
| 2010/0077216 A1 | 3/2010 | Kramer et al. | |
| 2010/0088297 A1 | 4/2010 | Kiilerich et al. | |
| 2010/0235254 A1* | 9/2010 | Mirrashidi et al. | 705/26 |
| 2010/0235889 A1* | 9/2010 | Chu et al. | 726/4 |
| 2010/0299219 A1* | 11/2010 | Cortes | G06F 9/445 705/26.35 |
| 2011/0010699 A1 | 1/2011 | Cooper et al. | |
| 2011/0060666 A1* | 3/2011 | Gromek et al. | 705/27.2 |
| 2011/0060741 A1* | 3/2011 | Heller et al. | 707/741 |
| 2011/0060776 A1* | 3/2011 | Suitts et al. | 707/827 |
| 2011/0060991 A1* | 3/2011 | Grant et al. | 715/718 |
| 2012/0166308 A1* | 6/2012 | Ahmed | G06Q 20/12 705/26.41 |
| 2012/0311724 A1* | 12/2012 | Mahan et al. | 726/29 |
| 2012/0330786 A1* | 12/2012 | Paleja et al. | 705/26.41 |

FOREIGN PATENT DOCUMENTS

| | | |
|---|---|---|
| CN | 1659564 | 8/2005 |
| CN | 1993693 | 7/2007 |
| KR | 10-2007-0000739 | 1/2007 |
| KR | 10-2008-0009589 | 1/2008 |
| KR | 10-2011-0006712 | 1/2011 |
| WO | 02/097620 | 12/2002 |
| WO | WO 2009/137477 | 11/2009 |
| WO | 2011/073125 | 6/2011 |

OTHER PUBLICATIONS

International Preliminary Report on Patentability from PCT Application No. PCT/US2012/052386 dated Mar. 13, 2014.

International Search Report and Written Opinion from PCT Application No. PCT/US2009/042838 dated Nov. 7, 2014.

International Preliminary Report on Patentability from PCT Application No. PCT/US2009/042838 dated Dec. 4, 2014.

International Search Report and Written Opinion from PCT Application No. PCT/US2009/042841 dated Dec. 2, 2013.

International Preliminary Report on Patentability from PCT Application No. PCT/US2009/042841 dated Dec. 17, 2013.

Miller II, Stanley A., "All that iWish for on my iPhone," Wilwaukee, Wisconsin, Journal Sentinel, Mar. 16, 2008, downloaded from http://www.jsonline.com/business/29487929.html, pp. 1-4, Mar. 16, 2008, 1-4.

Information Week. "Apple Plans Tight Control of iPhone App Distribution; With the exception of custom applications built by businesses solely for the use of iPhone-carrying workers, all software built will filter through Apple's App Store" (online] Mar. 7, 2008. [retrieved on Nov. 2, 2013] Retrieved from ProQuest <URL: http://search.proquest.com/professional/docview/1060926438?accountid=157282#> entire document.

\* cited by examiner

```xml
<specification>
    <developer>Fake Developer</developer>
    <software>
        <in_app_purchases>
            <in_app_purchase>
                <title>Power Up</title>
                <description>Power up powers you up!!</description>
                <image>image.gif</image>
                <product>
                    <cleared_for_sale>true</cleared_for_sale>
                    <price>3.99</price>
                </product>
            </in_app_purchase>
            <in_app_purchase>
                <title>Speed Up</title>
                <description>Speed up speeds you up!!</description>
                <image>image.gif</image>
                <product>
                    <cleared_for_sale>true</cleared_for_sale>
                    <intervals>
                        <interval>
                            <start_date>1/1/2011</start_date>
                            <end_date>5/1/2011</end_date>
                            <price>0.99</price>
                        </interval>
                        <interval>
                            <start_date>5/1/2011</start_date>
                            <price>1.99</price>
                        </interval>
                    </intervals>
                </product>
            </in_app_purchase>
        </in_app_purchases>
    </software>
</specification>
```

FIG. 3

```
<specification>
    <developer>Fake Developer</developer>
    <game_center>
        <achievement>
            <title>Super Achievement</title>
            <description>This is a great achievement</description>
            <image_before_earned>beforeimage.gif</image>
            <image_after_earned>afterimage.gif</image>
            <points>10</points>
        </achievement>
        <leaderboard>
            <title>My Leaderboard </title>
            <parent_leaderboard>leaderboard1</parent_leaderboard>
            <image>image1.gif</image>
            <sort_ascending>true</sort_ascending>
            <score>
                <score_minimum>100,000</score_minimum>
                <score_maximum>1,000,000</score_maximum>
            </score>
        </leaderboard>
    </game_center>
</specification>
```

FIG. 5

| Consumable | TYPE | Description | Price | ... |
|---|---|---|---|---|
| Con 1 | In app Purchase | Power Up | 0.99 | ... |
| Con 2 | Achievement | High Score | FREE | ... |
| Con 3 | Leaderboard | Top Scores | FREE | ... |
| ⋮ | | | | |
| ⋮ | | | | |
| ⋮ | | | | |
| Con N | ... | ... | ... | ... |

Done   Import

FIG. 8

```
<consumable>
    <cleared_for_sale>true</cleared_for_sale>
    <subscription>                                    ~905
        <issue_day>1</issue_day> ~910
        <price>3.99</price> ~915
    </subscription>
</consumable>
```

FIG. 9

```
<consumables>
    <consumable>                                      ~1005
        <territory>US</territory> ~1015
        <sales_start_date>2011-1-1</sales_start_date>
        <price_tier>3</price_tier> ~1035      1025
    </consumable>
    <consumable>                                      ~1010
        <territory>WW</territory> ~1020
        <sales_start_date>2011-3-1</sales_start_date>
        <price_tier>3</price_tier> ~1040      1030
    </consumable>
</consumables>
```

FIG. 10

MASS INGESTION OF CONTENT RELATED METADATA TO AN ONLINE CONTENT PORTAL

BACKGROUND

1. Technical Field

The present disclosure relates to submission of data to an online content portal and more specifically mass submission of content metadata to an online content portal.

2. Introduction

The emergence of online marketplaces gives product developers an online forum to make their products available to consumers all over the world. By simply uploading metadata describing their product to an online marketplace, developers can have their products made available to millions of consumers directly at their home computers or on their mobile devices. Although online marketplaces make it much easier to provide products to a large group of consumers all over the world, marketers are now faced with the huge task of loading the metadata describing their products.

Metadata describing a product is used to identify the product to be provided online. Currently, metadata describing a product, such as the developer, name, price, description, and image of a product, has to be entered by a developer on a content providers' server for each individual product being entered. This task is labor intensive and requires a developer to be logged onto the content provider's server. Further, all fields have to be entered for each individual item. Accordingly, if a developer is entering multiple similar items, the developer needs to fill out metadata for each item rather than just once for all related items. Therefore there exists a need for a more convenient and efficient way for developers to submit metadata to online marketplaces.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, devices, and non-transitory computer-readable storage media for the mass ingestion of metadata related to consumables related to online server supported applications.

In some embodiments the online server publishes a specification defining metadata fields, allowed format values, and other parameters to facilitate the mass submission of metadata related to consumables. Metadata arranged according to the specification can be fed to the online server via a data stream or through submission of a document including metadata defining a plurality of consumables.

The specification has been intelligently designed to account for the many different uses of consumables in applications supported by the server. As will be further described herein, the specification accounts for unique events pertaining to subscription content, in-application purchases, game performance and game award consumables, among others. Every type of consumable being able to be submitted in the same document.

By virtue of the published specification, developers can implement tools for managing their metadata and automate the creation of a document for submission to the server.

The server can validate the metadata for the content format and substance, and in some embodiments, can even compare the submitted metadata against contractual agreements between the developer and server.

The validated metadata can further be published by the server for access by the developer's applications and used to support in-application purchases, game award data, subscriptions, and other consumables.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an exemplary metadata file in a specified format;

FIG. 5 illustrates an exemplary metadata file defining game center consumables;

FIG. 8 illustrates an exemplary screenshot of a consumable loader application which provides a spreadsheet format graphical user interface;

FIG. 9 illustrates an exemplary embodiment of a metadata file which defines a consumable, which can be purchased as a subscription.

FIG. 10 illustrates an exemplary embodiment of a metadata file in which a consumables release date is varied based on territory.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
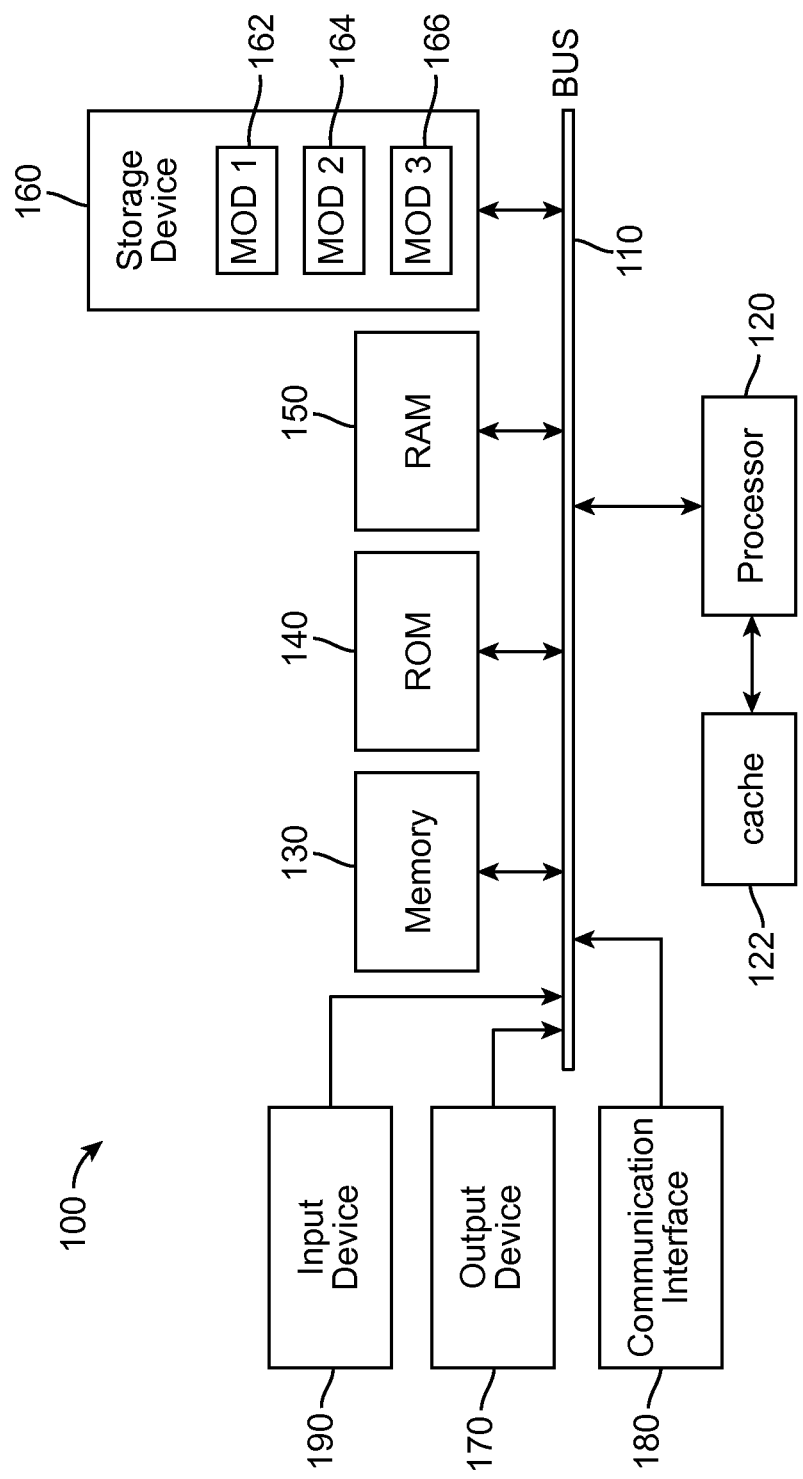
FIG. 1 illustrates an exemplary general-purpose computing device.

FIG. 1 illustrates an exemplary system that includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer; (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
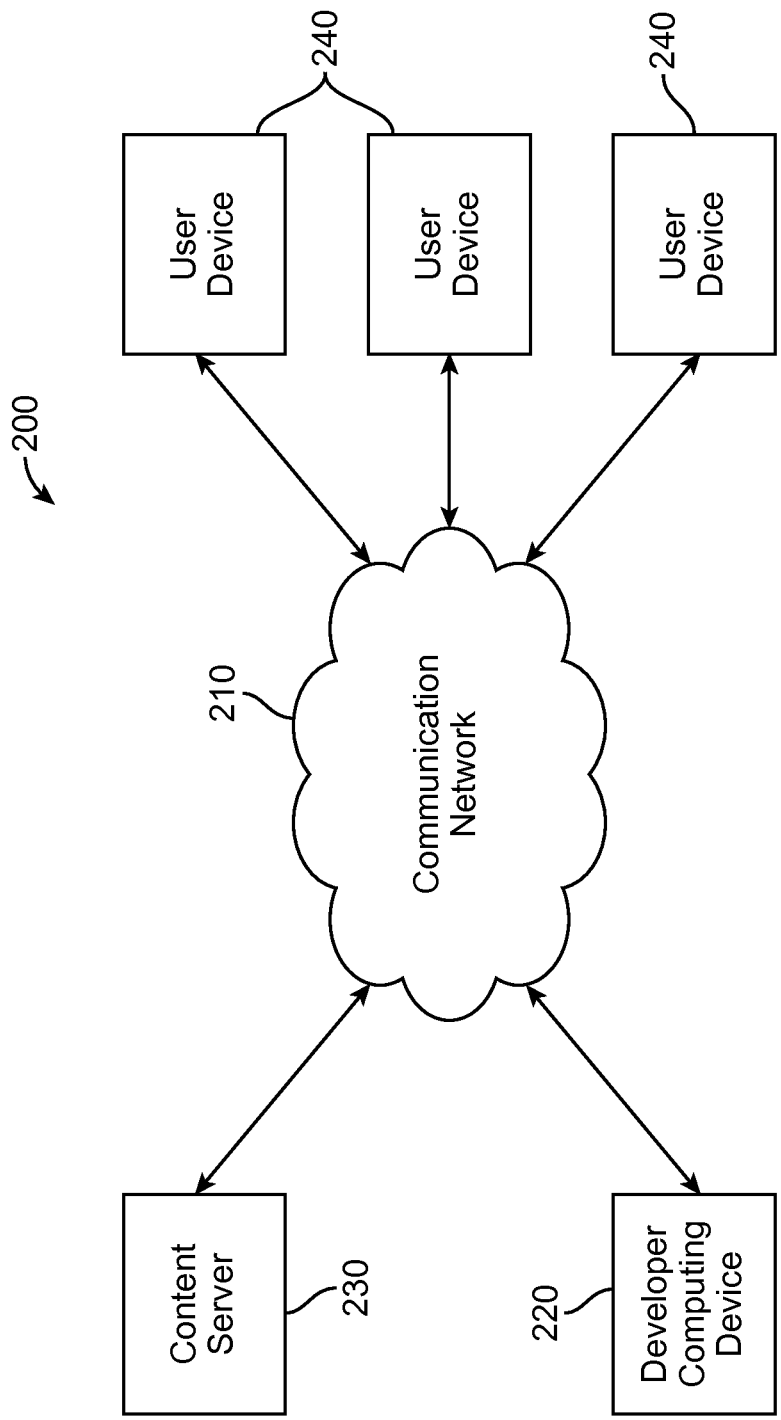
FIG. 2 illustrates an exemplary computing system.

Having disclosed some components of a computing system, the disclosure now turns to FIG. 2, which illustrates a computing environment wherein a developer can mass submit content metadata describing consumables to an online content portal. Developers can develop consumables to be provided to users. A consumable can be anything which is made available to a consumer and that requires server support to be provided. For example, consumables can include applications, in-application purchases, application updates, game achievements, subscriptions, electronic media, etc. In some embodiments, a consumable can be a publication such as a magazine or a book offered in an electronic format. In some embodiments, a consumable can be an in-application purchase such as coins to be redeemed in a gaming application. In some embodiments, consumables are items which do not need to be purchased, for example, a consumable may be a game achievement which can be achieved by a user playing a gaming application or an update to an existing application which can be downloaded and installed for free. In some embodiments a consumable can be a subscription to a service or product. For example, a consumable can be a subscription to a magazine which can be delivered in electronic format, physical format, or both. Alternatively, a consumable can be a subscription to a support service for a computing device or a subscription to a website. In some embodiments, consumables represent a physical item that can be purchased or rented electronically.

Once a developer finishes developing a consumable, the developer can make the consumable available to consumers by sending them to a content provider that provides the consumable to users though use of one or more channels through the communication network. In some embodiments, consumables are offered in online stores such as Apple's iTunes®, in other embodiments consumables can be made available on a website. In yet another embodiment, consumables can be made available within an application. In order to provide the consumable, content providers require metadata defining the consumable. Metadata defining consumables can consist of any data describing the consumable. For example, metadata defining the consumable can consist of a title, price, description, functionality, developer, screenshot, parent, score, compatibility, language, version, software, size, locale, format, reference name, category, product, copyright, keyword, URL, file name, encryption, code, intensity, cleared for sale, price tier, sale start date, intervals, asset, etc.

To provide the metadata to content providers, developers can create a file consisting of a compilation of metadata values. This file can be created on a developer computing device 220 which can be configured to communicate with a content server 230 via the communication network 210. The metadata file should be created in accordance with a specification specified or supported by the content server 230. The specification can define the format of the document and the required fields, by providing syntax rules that must be followed when creating the metadata file. For example, in some embodiments, the specification can provide syntax rules to create a data delivery language file such as an XML file with customized tags requiring certain metadata fields to be placed within certain tag regions. By following the syntax rules in the specification, a developer can create a metadata file defining a plurality of consumables. Once created, the metadata file can be transmitted to the content server 230 via the communication network 210 where it can be ingested and eventually published through one or more channels.

The metadata file can be created by a developer in multiple ways. For example, in some embodiments, a developer can create the metadata file with a word processor or code editor by simply following the defined syntax rules described in the specification. In other embodiments, a developer can automate the process by creating in house tools which create the metadata file in accordance with the defined specification. In other embodiments, the metadata file can be created using a consumable loader application provided by the content provider for this purpose. The consumable loader application can be an application which offers developers a graphical user interface (GUI) to add and define the metadata by filling out fields in the application. In some embodiments, the consumable loader application can be run on the content server 230 and accessed by the developer computing device 220 via the communications network 210. In other embodiments, the consumable loader application can be run on the developer computing device 220 and the developer can load all the metadata into the consumable loader application offline without needing to access the communications network 210 until the metadata is ready to be transmitted to the content server 230. A consumable loader application can be configured to take the data entered by the developer in the GUI and create a metadata file conforming to the syntax rules of the specification. In some embodiments the GUI may offer a spreadsheet layout in which developers can easily enter information by transferring or importing from their own spreadsheets.

The content server 230 can be configured to ingest metadata files and make the data available to user devices 240 via the communications network 210. Ingesting the metadata file can be an automated process of accepting the metadata files. In some embodiments ingesting can be accepting the metadata file from a data feed. In some embodiments ingesting can be receiving the metadata file from a consumable loader application running on the content server. In some embodiments the metadata files can be ingested individually. In some embodiments the metadata files can be accepted in bulk. Additionally, the content sever 230 can validate the metadata to ensure its conformance with the specification and content provider policies as defined in a contract between the content provider and the developer relating to each consumable. Content providers can set any number of policies regarding publishing consumables. For example, in some embodiments, a content provider can have a policy to not accept any in-application purchase or update associated with an existing application unless the existing application has already been reviewed and accepted. Therefore if a metadata file defining an in-application purchase is received at the content server 230, the content server 230 will check to ensure that the associated application has been reviewed prior to publishing. If the associated application has not been rejected or is still awaiting approval, the content server 230 will not publish the metadata and can send a message to the developer that the content has not been published because it does not conform to policy.

Metadata files can also be validated to ensure that they conform to the specification. This can include checking for simple mistakes such as syntax errors and misspellings within the file document. It can also include validating that all the data fields are proper based on the type of information being entered. For example, in some embodiments, different data fields can be required based on the type of consumable. A content provider can require that an image and a price be included when entering an in-application purchase. In some embodiments, the specification can also require that certain data fields be omitted based on the data type. For example, if a consumable is an update, the specification can require that no price data be entered. The content server 230 can validate that the metadata file conforms to these rules of the specification, and if it does not, can alert the developer of the errors. In some embodiments, validation can take place prior to the ingestion of the metadata file. This can be done so that time and resources are not spent ingesting invalid files. In some embodiments the validating can take place after or as part of the ingesting process.

Once a metadata file has been ingested and validated by the content server 230, the data can be prepared and made ready to be published. In some embodiments the metadata can be extracted and used to create a file in another format. In some embodiments another file or program can extract the metadata directly from the file when publishing and no new file is created. A developer may want to run their own validation on the prepared data to ensure that it contains no errors and meets their approval. A developer can therefore send a request from the developer computing device 220 to the content server 230, via the communication network 210, requesting that the prepared data be sent back to the developer computing device 220 for validation. Once the request is received, the content server 230 can send back the prepared data to the developer computing system 220 using the communication network 210. Once received by the developer computing system 220, the developer can perform quality tests in a sandboxed testing environment.

FIG. 3 illustrates an exemplary metadata file 300 in a specified format. As illustrated, the specification can specify that the metadata file 300 be organized by using data tags which can define the content type of the data field as well as its dimensions. For example, the data field defining the developer 305 begins with a first data tag labeled <developer> and ends with a second data tag labeled </developer>. In this embodiment, as is conventional in XML the forward slash is used to signify the second tag. The data between the tags is the metadata value. As illustrated, the metadata value for the developer field 305 has been defined as "Fake Developer." Data fields can also be nested within other data fields.

In some embodiments the specification can be configured so that a data field is shared across multiple consumables. For example, the metadata file illustrated in FIG. 3 defines two in-application purchases 315 and 320. Both of the in-application purchases share the common developer data field 305, so that the specification only requires that the developer be named once and it is associated with both in-application purchases 315 and 320.

Figure 4:
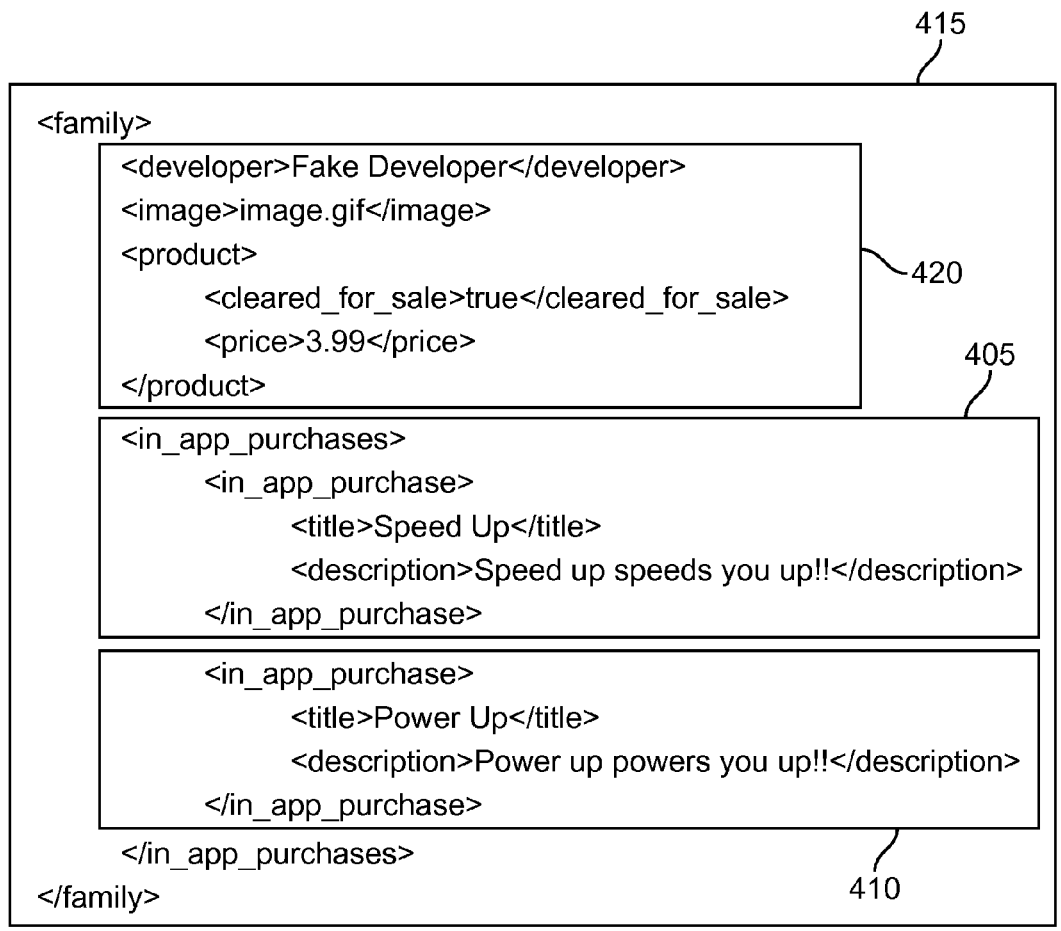
FIG. 4 illustrates an exemplary metadata file in which data fields are shared across multiple consumables.

FIG. 4 illustrates another example of how data fields can be shared across multiple consumables. As illustrated, two in-application purchases have been defined 405 and 410. Both in-application purchases have the same developer, image and price, and both have been cleared for sale. To eliminate rewriting the same data for each in-application purchase, both in-application purchases have been included in the same family data field 415 and so the common data fields 420 can be included only once but be associated with both in-application purchases 405 and 410.

Returning to FIG. 3, the specification can be configured to also allow a developer to define pricing intervals. For example, a developer can choose to initially market a new in-application purchase at a discounted price to increase initial purchases before changing the price to the regular amount. In some embodiments pricing can be specified by tiers, rather than actual dollar amounts. In some embodiments the pricing can include zero value such that the consumable is free to the user. The second defined in-application purchase 320 includes an intervals tag 325 which can allow a developer to define a time range for data fields. Two intervals have been defined 330 and 335. As illustrated, interval 335 defines that from the start date of Jan. 1, 2011 until the end date of May 1, 2011, the price will be 0.99. Interval 335 defines that from a start date on May 1, 2011 with no end date, the price will be 1.99. Although the interval tag was used to change the price in this example, any data field can be changed based on intervals if the specification supports intervals for that data field.

FIG. 9 illustrates an exemplary embodiment of a metadata file defining a consumable which can be purchased as a subscription. In some embodiments a consumable can require that the user make payments on a schedule, for example, a consumable can be a magazine that publishes a new issue every month or a service which requires payment each month. Accordingly, the metadata file can reflect this type of pricing option. As illustrated, a subscription data field has been defined 905. An embedded issue day data field 910 has been defined as 1, indicating that the subscription price should be paid every $1^{st}$ of the month. The price data field 915 is defined as 3.99, so that if purchased, the consumable will be 3.99 and the user will be charged every $1^{st}$ of the month. In some embodiments, a developer can define a set number of days between charging a user, such as every 30 days, rather than setting a day of the month for charges to reoccur.

FIG. 10 illustrates an exemplary embodiment of a metadata file in which consumables are defined based on territories. In some embodiments, a developer can choose to release a consumable world-wide or just in select territories. As illustrated, two consumable data fields 1005 and 1010 have been defined. The territory data field 1015 of consumable 1005 has been defined to be US to signify the United States of America, whereas the territory data field 1020 of consumable 1010 has been defined as WW to signify worldwide. Consumable 1005 has a defined sales start date data field 1025 as Jan. 1, 2011, whereas the sales start data field 1030 of consumable 1010 has been defined as Mar. 1, 2011. Accordingly, consumable 1005 will be available for purchase within the US on Jan. 1, 2011 while consumable 1010 will be available world-wide starting Mar. 1, 2011. In some embodiments, a developer may wish to release a consumable in one territory prior to other territories. In the illustrated example, consumable 1005 and consumable 1010 can refer to the same product so that the product will be released in the US on Jan. 1, 2011 and then worldwide starting Mar. 1, 2011.

Further, both consumable 1015 and 1020 use pricing tiers rather than a set purchase amount. A pricing tier can price a consumable a set predetermined amount such that all consumables priced within a specified tier are the same price. The pricing tier data field 1035 and 1040 for each consumable has been defined as tier 3. Tiers can be used to ensure an equal pricing across multiple territories with different currencies. Accordingly, a tier 3 priced consumable should cost the same comparatively whether being paid for in Euros or US dollars. Further, using tiers can make changing prices less labor intensive. The price of the tier can be changed once to change the price of all consumables within that tier. For example, if the predetermined tier 3 price is $3.00 US, changing this predetermined price to $3.25 US will change the price of all consumables with a price tier data field defined as tier 3.

FIG. 5 illustrates an exemplary embodiment of a metadata file describing game center consumables. As illustrated, two consumables are defined. The first is an in-game achievement 505 and the second is a leaderboard 510. As illustrated, the developer data field has been associated as a common metadata value across both consumables.

The first defined game center consumable is an in-game achievement 505. An in-game achievement can be an award given for performing a particular task or set of tasks within a gaming application. For example, in some embodiments an in-game achievement can be awarded for passing a level within a predetermined amount of time. In some embodiments an in-game achievement can be awarded if a predetermined number of tasks are performed. The reward given for achieving an in-game achievement can be any type of award chosen by the developer. In some embodiments users can be awarded points for achieving an in game achievement. In some embodiments the user can be awarded a virtual trophy to be associated with the user's profile. In some embodiments the user can be awarded a physical item such as a t-shirt or trophy. As illustrated, the points data field 515 has been defined as 10 and so the user is awarded 10 points 515 for achieving the defined in-game achievement.

In some embodiments, a developer may wish to change the image associated with an in-game achievement based on its status in respect to a user. For example, a developer may wish to have a shadowed image of a trophy displayed while a user has not earned an achievement and then have that image changed to one displaying the trophy in full light once the user has achieved the in-game achievement. As illustrated, the developer has configured the metadata file to achieve this goal. The developer has defined the image in the before earned data field 520 as beforeimage.gif and the image in the after earned data field 525 as afterimage.gif. Therefore, while the user has not achieved the achievement, the before image will be displayed, however after the user has achieved the achievement, the after image will be displayed.

The second defined game center consumable is a leaderboard 510. A leaderboard can be any type of leaderboard associated with a gaming application in which users accomplishments are listed. In some embodiments a leaderboard can simply list the highest scores. In some embodiments the leaderboard can be a list of users who have achieved the greatest number of achievements or just simply a list of users who have achieved a certain achievement. In some embodiments the leaderboard can be associated with a parent leaderboard such that the leaderboard lists a subset of the parent leaderboard. For example, a leaderboard which displays all the users who have achieved one particular achievement, may be a subset of a leaderboard displaying the users with the greatest number of total achievements within the same gaming application. In the illustrated embodiment, the parent leaderboard data field 530 has been define as leaderboard1. The defined leaderboard 510 is thus associated with leaderboard1. This can include pulling data from the same database of scores or achievements. In some embodiments a leaderboard can be a defined subset of the parent leaderboard. For example, in the illustrated embodiment, the minimum score data field 545 has been defined as 100,000 and the maximum score data field 550 has been defined as 1,000,000. The defined leaderboard 510 has thus been defined as a subset of the parent leader board, leaderboard1, and will only display scores within the range of 100,000 to 1,000,000. A developer can also define how the data on the leaderboard is displayed. For example, in the illustrated embodiment, the sort ascending data field 535 has been set to be true. Accordingly the data will be displayed in ascending order. In some embodiments the leaderboard data can be displayed in alphabetical order. In some embodiments the leaderboard data can be displayed based on time such that the most recent scores or achievements are listed first.

Figure 6:
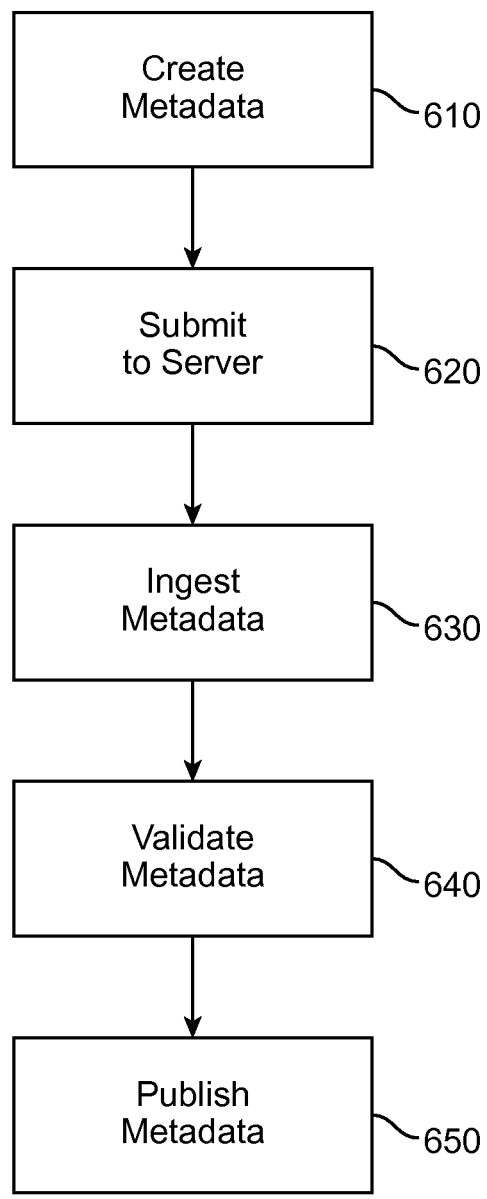
FIG. 6 illustrates an exemplary method for mass submission of metadata to an online content portal.

FIG. 6 illustrates a flowchart for mass submitting and ingestion of metadata to an online content server for publication. At step 610 a developer creates a file consisting of a compilation of metadata according to a specification which defines a plurality of consumables. The file can be created manually by a developer or through use of an automated process created by the developer. Alternatively, the metadata file can be created by using an application loader application provided by the content provider.

Once the metadata file has been created, it can be submitted 620 to the content provider's server via a communication network. In some embodiments, the content provider can make a data feed available for transmitting the files.

After the metadata file has been submitted to and ingested 630 by the content server, the metadata file can then be validated 640 to ensure that it conforms with the server policy relating to the consumables. The metadata can also be validated to ensure that it conforms to the specification.

After the metadata has been ingested 630, a developer may want to receive the data back to run verifications on the metadata to ensure quality. The ingested metadata can be transmitted back to the developer for this reason.

At 650, the metadata is published by the content provider. This can include providing the ingested metadata on a website or on an online marketplace. Alternatively the ingested metadata may be published within an application in communication with the content provider's server.

Figure 7:
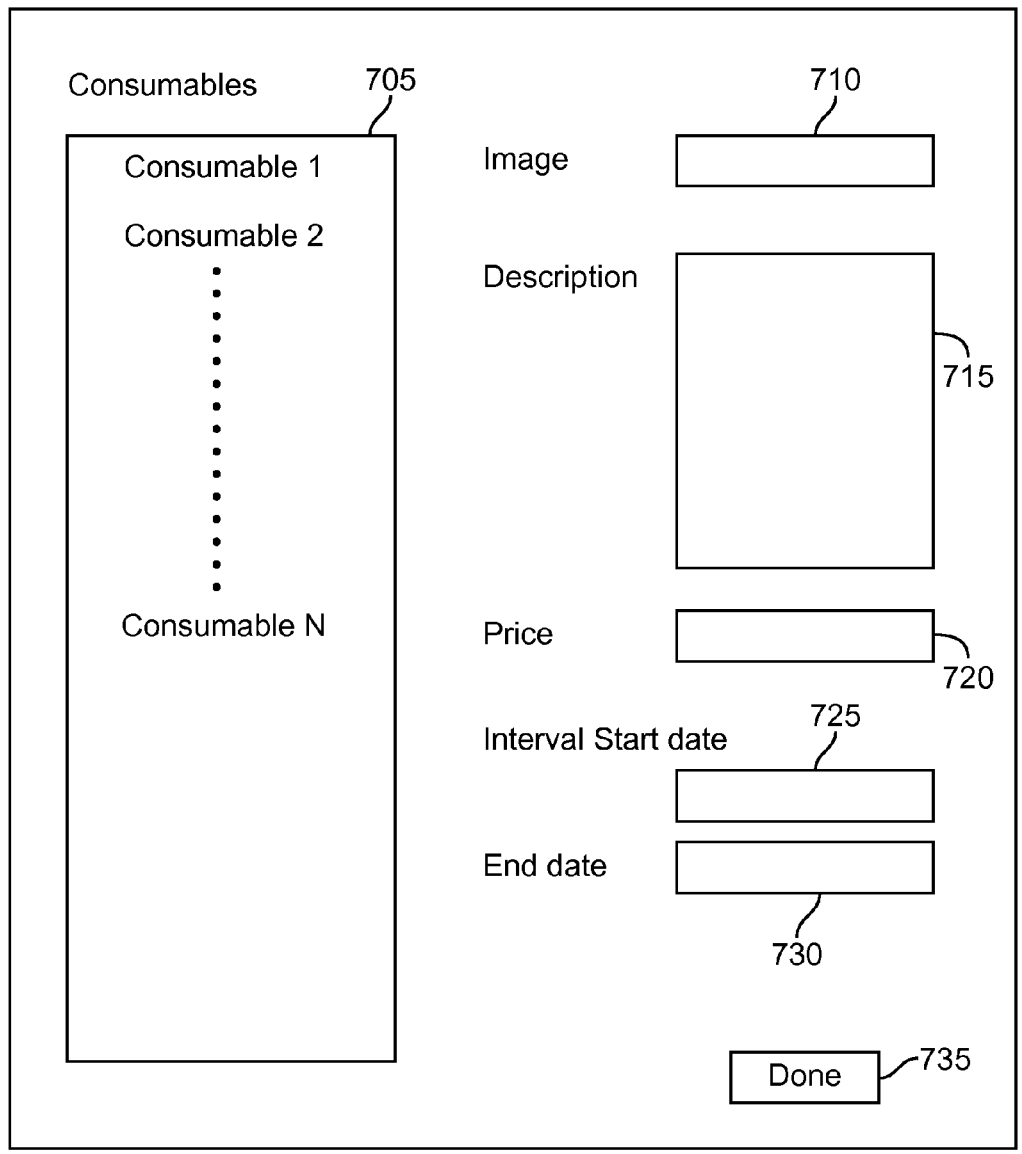
FIG. 7 illustrates an exemplary screenshot of a consumable loader application's graphical user interface.

FIG. 7 illustrates an exemplary embodiment of the consumable loader application's graphical user interface. In this embodiment a consumables list is displayed 705 which displays all the consumables that have already been entered into the system. From this list, a developer can click on any number of entered consumables and enter or change data fields for one or all of them at one time. For example, if a developer wants to use the same image for 3 different consumables, the developer can choose all three from the list and then enter the image file into the image data field 710. The developer can do the same thing with any other data field, for example the description 715 or price 720 data fields. Additionally, the developer can set any of the data fields as an interval by filling out the interval start date 725 and interval end date 730 data fields. For example, a developer can choose multiple consumables to place at a reduced price for a 1 week period by choosing the consumables from the consumables list 705, and entering the reduced price in the price data field 720 and the begin and end dates of the interval in the interval data fields 725 and 730. A developer can also add new consumables in to field 705. Upon completion the done button 735 can be pressed to create the metadata file based on the inputted data and in accordance with the content provider's specification.

FIG. 8 illustrates an exemplary embodiment of the consumable loader application in which a spreadsheet layout is provided to the developer. This layout allows developers to easily input metadata values for multiple consumables while also being able to view all the entered data at once. As illustrated, developers can enter the data values for multiple consumables by filling in the spreadsheet 805. Alternatively, developers can import the metadata from already created spreadsheets by using the import button 810. The import button 810 can be configured to allow a developer to choose an existing spreadsheet on their computing device to import into the consumable loader application GUI spreadsheet 805. In addition to importing the metadata from the spreadsheet, the consumable loader application can notify the developer of any inconsistencies between the format or metadata fields in the imported spreadsheet and the one offered in the consumable loader application.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method for an existing application that has been previously reviewed and previously approved by a server associated with an online store, comprising:
   ingesting, by a networked server computer associated with the online store, a compilation of metadata values associated with the existing application supported by the online store, the compilation of metadata values being arranged according to a specification and defining a plurality of consumables, the consumables being virtual items to be made available to a device within the existing application supported by the online store and which require support from the server associated with the online store;
   verifying, using a processor, that the compilation of metadata values conforms with a server policy relating to the consumables, wherein the server policy comprises verification that the existing application associated with the metadata values has been previously reviewed and previously approved by the server associated with the online store; and
   validating, using the processor, the verified compilation of metadata values for conformance with the specification.

2. The computer implemented method of claim 1, wherein the specification defines a family tag that groups a plurality of consumables that share common metadata values.

3. The computer implemented method of claim 1, wherein the server policy is based on a contractual relation between a developer and content provider, the contractual relation associated with each consumable.

4. The computer implemented method of claim 1, wherein the specification defines an interval tag that defines time limits for metadata associated with a consumable.

5. The computer implemented method of claim 1, wherein the compilation of metadata is arranged according to the specification by a consumable loader application.

6. The computer implemented method of claim 5, wherein the consumable loader application provides a graphical user interface for entering metadata values.

7. The computer implemented method of claim 6, wherein the consumable loader application's graphical user interface provides a spreadsheet style interface for entering metadata.

8. The computer implemented method of claim 5, wherein the consumable loader application allows modifying metadata values for multiple consumables simultaneously.

9. The computer implemented method of claim 1, further comprising:
   receiving via a data feed, at the networked server computer, the compilation of metadata values being arranged according to the specification.

10. The computer implemented method of claim 9, wherein the data feed is an XML data feed.

11. The computer implemented method of claim 1, further comprising:
   publishing the ingested compilation of metadata values being arranged according to a specification.

12. The computer implemented method of claim 1, further comprising:
   transmitting, by the networked server computer, the ingested compilation of metadata values being arranged according to a specification to a developer's computing device.

13. The method of claim 1, wherein the existing application is not transmitted with the compilation of metadata values.

14. The method of claim 4, wherein the metadata values define a pricing tier, the pricing tier being valid during the interval tag and setting a predetermined amount for the associated consumables.

15. The method of claim 1, wherein the consumables are in application purchases or game awards.

16. A system with an existing application that has been previously reviewed and previously approved by a server associated with an online store, comprising:
   a networked server computer associated with the online store configured to ingest a compilation of metadata values associated with the existing application supported by the online store, the compilation of metadata values being arranged according to a specification and defining a plurality of consumables, the consumables being virtual items to be made available to a device within the existing application supported by the online store and which require support from the server associated with the online store;

a developer computer in electronic communication with the networked server computer configured to transmit the compilation of metadata values being arranged according to the specification; and a validation module configured to verify that the compilation of metadata values conforms with a server policy relating to the consumables, wherein the server policy comprises verification that the existing application associated with the metadata values has been previously reviewed and previously approved by the server associated with the online store, and further configured to validate the verified compilation of metadata values for conformance with the specification.

17. The system of claim 16, wherein the server policy is based on a contractual relation between a developer and content provider.

18. The system of claim 16, further comprising:
a publication module configured to publish the consumables defined by the validated metadata to the networked server computer.

19. The system of claim 16, further comprising:
a networked user device configured to run the existing application that is itself configured to access the published consumables on the networked server computer for presentation of the published consumables on the networked user device.

20. A non-transitory computer readable medium having computer readable instructions stored thereon for causing a computer to perform the steps for an existing application that has been previously reviewed and previously approved by a server associated with an online store, comprising:

ingesting, by a networked server computer associated with the online store, a compilation of metadata values associated with the existing application supported by the online store, the compilation of metadata values being arranged according to a specification and defining a plurality of consumables, the consumables being virtual items to be made available to a device within the existing application supported by the online store and which require support from the server associated with the online store;

verifying, using a processor, that the compilation of metadata values conforms with a server policy relating to the consumables, wherein the server policy comprises verification that the existing application associated with the metadata values has been previously reviewed and previously approved by the server associated with the online store; and validating, using the processor, the verified compilation of metadata values for conformance with the specification.

21. The non-transitory computer readable medium of claim 20, wherein the server policy is based on a contractual relation between a developer and content provider.

22. The non-transitory computer readable medium of claim 20, further comprising:
publishing the consumables defined by the validated metadata to the networked server computer.

23. A device with an existing application that has been previously reviewed and previously approved by a server associated with an online store, comprising:

a network interface associated with the online store configured to ingest a compilation of metadata values associated with the existing application supported by the online store, the compilation of metadata values being arranged according to a specification and defining a plurality of consumables, the consumables being virtual items to be made available to a consumer device within the existing application supported by the online store and which require support from the server associated with the online store; and a processor configured to verify that the compilation of metadata values conforms with a server policy relating to the consumables, wherein the server policy comprises verification that the existing application associated with the metadata values has been previously reviewed and previously approved by the server associated with the online store, and further configured to validate that the verified compilation of metadata values conforms with the specification.

24. The device of claim 23, further comprising:
a storage device configured to store the consumables defined by the validated metadata, the storage device is configured to be accessible to a consumer device over the network interface, whereby the consumables are made available to the existing application being executed on the consumer device.

25. The method of claim 1, wherein the consumables are in-application purchases.

* * * * *